(12) United States Patent
Dietrich

(10) Patent No.: US 10,518,595 B2
(45) Date of Patent: Dec. 31, 2019

(54) COMBINED FLYING/DRIVING VEHICLE WITH VERTICAL TAKEOFF AND FIXED-WING CRUISE CAPABILITIES

(71) Applicant: Terrafugia, Inc., Woburn, MA (US)

(72) Inventor: Carl C. Dietrich, Woburn, MA (US)

(73) Assignee: Terrafugia, Inc., Woburn, MA (US)

( * ) Notice: Subject to any disclaimer, the term of this patent is extended or adjusted under 35 U.S.C. 154(b) by 684 days.

(21) Appl. No.: 14/777,247

(22) PCT Filed: Mar. 14, 2014

(86) PCT No.: PCT/US2014/028225
§ 371 (c)(1),
(2) Date: Sep. 15, 2015

(87) PCT Pub. No.: WO2014/144001
PCT Pub. Date: Sep. 18, 2014

(65) Prior Publication Data
US 2016/0023527 A1    Jan. 28, 2016

Related U.S. Application Data

(60) Provisional application No. 61/790,763, filed on Mar. 15, 2013.

(51) Int. Cl.
| | |
|---|---|
| *B60F 5/00* | (2006.01) |
| *B60F 5/02* | (2006.01) |
| *B64C 29/00* | (2006.01) |
| *B64C 37/00* | (2006.01) |
| *B64D 35/02* | (2006.01) |

(Continued)

(52) U.S. Cl.
CPC .............. *B60F 5/02* (2013.01); *B64C 3/56* (2013.01); *B64C 11/001* (2013.01); *B64C 29/0033* (2013.01); *B64C 37/00* (2013.01); *B64D 35/02* (2013.01); *B64D 2027/026* (2013.01); *Y02T 50/64* (2013.01)

(58) Field of Classification Search
CPC .............. B64C 37/00; B64C 3/56; B60F 5/02
See application file for complete search history.

(56) References Cited

U.S. PATENT DOCUMENTS

| 827,017 A | 7/1906 | Hofmann |
|---|---|---|
| 1,286,679 A | 12/1918 | Longobardi |

(Continued)

FOREIGN PATENT DOCUMENTS

| CN | 1784338 A | 6/2006 |
|---|---|---|
| CN | 201385556 | 1/2010 |

(Continued)

OTHER PUBLICATIONS

Communication Relating to the Results of the Partial International Search in PCT/US2007/000256 dated Oct. 2, 2007 5 pages.

(Continued)

*Primary Examiner* — Joseph W Sanderson
*Assistant Examiner* — Aaron M Rodziwicz
(74) *Attorney, Agent, or Firm* — Lee & Hayes, P.C.

(57) ABSTRACT

A combined flying-driving vehicle having a hybrid propulsion system architecture, foldable wings, and rotatable propulsion devices that is capable of vertical take-off and landing (VTOL), fixed wing cruise, and legally operating one a roadway surface.

20 Claims, 7 Drawing Sheets

(51) Int. Cl.
*B64C 3/56* (2006.01)
*B64C 11/00* (2006.01)
*B64D 27/02* (2006.01)

(56) References Cited

U.S. PATENT DOCUMENTS

| | | | |
|---|---|---|---|
| 1,731,757 A | 10/1929 | Tubbe | |
| 1,756,463 A | 4/1930 | Jezek | |
| 1,816,653 A | 7/1931 | Nelsch | |
| 1,998,148 A | 4/1935 | Vieriu | |
| 2,077,471 A | 4/1937 | Fink | |
| D106,939 S | 11/1937 | Waterman | |
| 2,135,073 A | 11/1938 | Gerhart | |
| 2,166,564 A | 7/1939 | Atwood et al. | |
| 2,215,003 A | 9/1940 | Johnson | |
| 2,241,577 A | 5/1941 | Beals, Jr. | |
| 2,280,809 A | 4/1942 | Evans | |
| 2,289,224 A | 7/1942 | Swanson et al. | |
| 2,290,850 A | 7/1942 | Umschweif | |
| 2,338,751 A | 1/1944 | Zuck | |
| 2,373,467 A | 4/1945 | Frakes | |
| 2,402,468 A | 6/1946 | Thompson | |
| 2,410,234 A | 10/1946 | Read et al. | |
| 2,422,056 A | 6/1947 | Vogt | |
| 2,424,769 A | 7/1947 | Page | |
| 2,427,936 A | 9/1947 | Wales, Jr. | |
| 2,430,869 A | 11/1947 | Fulton, Jr. | |
| 2,434,068 A | 1/1948 | Geisse | |
| 2,446,528 A | 8/1948 | Clark | |
| 2,462,462 A | 2/1949 | Boggs et al. | |
| D153,331 S | 4/1949 | Zuck | |
| D155,569 S | 10/1949 | Bailey | |
| 2,494,547 A | 1/1950 | Fish, Jr. | |
| 2,538,602 A | 1/1951 | Taylor et al. | |
| 2,539,489 A | 1/1951 | Smith | |
| 2,544,021 A | 3/1951 | Holland | |
| 2,562,490 A | 7/1951 | Hall | |
| 2,563,731 A | 8/1951 | Masterson | |
| 2,573,271 A | 10/1951 | Perl | |
| 2,593,785 A | 4/1952 | Nye et al. | |
| 2,609,167 A | 9/1952 | Gero, Jr. | |
| 2,624,530 A | 1/1953 | Hanssen | |
| 2,811,323 A | 7/1953 | Rethorst | |
| 2,666,602 A | 1/1954 | Holland | |
| 2,674,422 A | 4/1954 | Pellarini | |
| 2,675,976 A | 4/1954 | Gerardine | |
| 2,681,773 A | 6/1954 | Rethorst | |
| 2,692,095 A | 10/1954 | Carpenter | |
| 2,712,421 A | 7/1955 | Naumann | |
| 2,713,465 A | 7/1955 | Novinger | |
| 2,734,705 A | 2/1956 | Robertson | |
| 2,767,939 A | 10/1956 | Taylor | |
| 2,770,427 A | 11/1956 | Schreffler | |
| 2,777,649 A | 1/1957 | Williams | |
| 2,893,661 A | 7/1959 | Aylor | |
| 2,923,494 A | 2/1960 | Strong | |
| 2,923,681 A | 2/1960 | Hein et al. | |
| 2,936,969 A | 5/1960 | Griffith et al. | |
| 2,939,649 A | 6/1960 | Shaw | |
| 2,940,688 A | 6/1960 | Bland | |
| 2,945,646 A | 7/1960 | Sturgeon | |
| 2,955,780 A | 10/1960 | Hulbert | |
| 2,968,453 A | 1/1961 | Bright | |
| 2,972,898 A | 2/1961 | Hartel | |
| 2,973,921 A | 3/1961 | Price | |
| 2,975,676 A | 3/1961 | Butler | |
| 2,988,301 A | 6/1961 | Fletcher | |
| 3,012,737 A | 12/1961 | Dodd | |
| 3,029,042 A | 4/1962 | Martin | |
| 3,039,537 A | 6/1962 | Heidelberg | |
| 3,056,654 A | 10/1962 | Barrer et al. | |
| 3,065,927 A | 11/1962 | Mills | |
| 3,083,936 A | 4/1963 | Rethorst | |
| 3,090,581 A | 5/1963 | Einarsson | |
| 3,134,560 A | 5/1964 | Halsmer | |
| 3,139,244 A | 6/1964 | Bright | |
| 3,161,374 A | 12/1964 | Allred et al. | |
| 3,167,273 A | 1/1965 | Alvarez Calderon | |
| 3,174,573 A | 3/1965 | Chaplin | |
| 3,179,353 A | 4/1965 | Peterson | |
| 3,179,354 A | 4/1965 | Alvarez-Calderon | |
| 3,184,183 A | 5/1965 | Piasecki | |
| 3,198,082 A | 8/1965 | Kerris | |
| 3,201,067 A | 8/1965 | Meyerhoff | |
| 3,203,645 A | 8/1965 | Shaw | |
| 3,231,221 A | 1/1966 | Platt | |
| 3,244,246 A | 4/1966 | Weiland | |
| 3,261,572 A | 7/1966 | Gorton | |
| 3,262,657 A | 7/1966 | Anker-Holth | |
| 3,265,326 A | 8/1966 | Mach et al. | |
| 3,265,329 A | 8/1966 | Postelson | |
| 3,289,977 A | 12/1966 | Staats | |
| 3,317,161 A | 5/1967 | Sawyer | |
| 3,371,886 A | 3/1968 | Schertz | |
| 3,383,074 A | 5/1968 | Coplin | |
| 3,397,852 A | 8/1968 | Katzen | |
| 3,397,854 A | 8/1968 | Reyle | |
| 3,454,238 A | 7/1969 | Goodson | |
| 3,481,559 A | 12/1969 | Apostolescu | |
| 3,519,224 A | 7/1970 | Boyd et al. | |
| 3,559,921 A | 2/1971 | Timperman | |
| 3,584,810 A | 6/1971 | Velton | |
| 3,612,440 A | 10/1971 | Strong | |
| 3,627,235 A | 12/1971 | Lippisch | |
| 3,645,474 A | 2/1972 | Arbuse | |
| 3,665,809 A | 5/1972 | Walker et al. | |
| 3,713,748 A | 1/1973 | Langley | |
| 3,827,527 A | 8/1974 | Bertelsen | |
| 3,873,049 A | 3/1975 | Horsdal | |
| 3,912,201 A | 10/1975 | Bradbury | |
| 3,931,942 A | 1/1976 | Alpert | |
| 3,960,103 A | 6/1976 | Rey | |
| 4,022,403 A | 5/1977 | Chiquet | |
| 4,043,421 A | 8/1977 | Smith | |
| 4,194,707 A | 3/1980 | Sharpe | |
| 4,240,601 A | 12/1980 | Reed | |
| 4,269,374 A | 5/1981 | Miller | |
| 4,358,072 A | 11/1982 | Williamson | |
| 4,505,442 A | 3/1985 | Kirsch et al. | |
| 4,505,443 A | 3/1985 | Bradfield et al. | |
| 4,559,822 A | 12/1985 | Huntington | |
| 4,579,297 A * | 4/1986 | Ayoola | B60F 3/00 244/106 |
| 4,598,890 A | 7/1986 | Herzog et al. | |
| 4,627,585 A * | 12/1986 | Einstein | B64C 37/00 244/2 |
| 4,754,940 A | 7/1988 | Deter | |
| 4,765,568 A | 8/1988 | Carl et al. | |
| 4,778,129 A | 10/1988 | Byford | |
| 4,795,111 A | 1/1989 | Moller | |
| 4,796,836 A | 1/1989 | Buchelt | |
| 4,824,048 A | 4/1989 | Kim | |
| 4,828,203 A | 5/1989 | Clifton et al. | |
| 4,834,319 A | 5/1989 | Ewy et al. | |
| 4,856,732 A | 8/1989 | Eickmann | |
| 4,865,275 A | 9/1989 | Thompson | |
| 4,881,700 A * | 11/1989 | Sarh | B64C 37/00 244/2 |
| 4,881,701 A | 11/1989 | Bullard | |
| 4,892,274 A | 1/1990 | Pohl et al. | |
| 4,899,954 A * | 2/1990 | Pruszenski, Jr. | B64C 37/00 244/2 |
| 4,913,375 A | 4/1990 | Fitzpatrick | |
| 4,917,332 A | 4/1990 | Patterson, Jr. | |
| 4,934,629 A | 6/1990 | Brant | |
| 4,986,493 A * | 1/1991 | Sarh | B64C 37/00 244/2 |
| 5,025,382 A * | 6/1991 | Artz | G06F 3/033 340/945 |
| 5,050,817 A * | 9/1991 | Miller | B64C 37/00 244/120 |
| 5,064,143 A | 11/1991 | Bucher | |
| 5,101,927 A | 4/1992 | Murtuza | |

(56) References Cited

U.S. PATENT DOCUMENTS

| | | | |
|---|---|---|---|
| 5,115,996 A * | 5/1992 | Moller | B64C 29/0025 |
| | | | 239/265.19 |
| 5,141,173 A | 8/1992 | Lay | |
| D331,893 S | 12/1992 | Szakacs | |
| 5,201,478 A | 4/1993 | Wooley | |
| 5,201,479 A | 4/1993 | Renzelmann | |
| 5,209,428 A | 5/1993 | Bevilaqua et al. | |
| 5,226,350 A | 7/1993 | Cycon et al. | |
| 5,297,761 A | 3/1994 | Kendall, Jr. et al. | |
| 5,310,138 A | 5/1994 | Fitzgibbon | |
| 5,350,135 A | 9/1994 | Renzelmann et al. | |
| 5,356,094 A | 10/1994 | Sylvain | |
| 5,381,985 A | 1/1995 | Wechsler et al. | |
| 5,381,986 A | 1/1995 | Smith et al. | |
| 5,419,514 A | 5/1995 | Ducan | |
| 5,427,329 A | 6/1995 | Renzelmann et al. | |
| 5,452,643 A | 9/1995 | Smith et al. | |
| 5,454,531 A | 10/1995 | Melkuti | |
| 5,558,299 A | 9/1996 | Veile | |
| 5,645,250 A | 7/1997 | Gevers | |
| 5,666,483 A | 9/1997 | McClary | |
| 5,746,390 A | 5/1998 | Chiappetta | |
| 5,765,783 A | 6/1998 | Albion | |
| 5,806,805 A | 9/1998 | Elbert et al. | |
| 5,823,470 A | 10/1998 | Craig et al. | |
| 5,836,541 A | 11/1998 | Pham | |
| 5,850,990 A | 12/1998 | Gevers | |
| 5,890,441 A | 4/1999 | Swinson et al. | |
| 5,984,228 A | 11/1999 | Pham | |
| 6,073,882 A * | 6/2000 | Zieger | B60F 5/02 |
| | | | 244/124 |
| 6,082,665 A | 7/2000 | Spitzer | |
| 6,085,151 A | 7/2000 | Farmer et al. | |
| 6,086,014 A | 7/2000 | Bragg, Jr. | |
| 6,089,501 A | 7/2000 | Frost | |
| 6,098,927 A | 8/2000 | Gevers | |
| 6,105,901 A | 8/2000 | Ulanoski et al. | |
| 6,119,985 A | 9/2000 | Clapp et al. | |
| 6,129,306 A | 10/2000 | Pham | |
| 6,131,848 A | 10/2000 | Crow | |
| 6,170,778 B1 | 1/2001 | Cycon et al. | |
| 6,186,574 B1 | 2/2001 | Motozawa et al. | |
| 6,224,012 B1 | 5/2001 | Wooley | |
| 6,227,481 B1 | 5/2001 | Fenny et al. | |
| 6,247,667 B1 | 6/2001 | Fenny et al. | |
| 6,254,032 B1 | 7/2001 | Bucher | |
| 6,260,793 B1 | 7/2001 | Balayn et al. | |
| 6,270,038 B1 | 8/2001 | Cycon et al. | |
| 6,276,633 B1 | 8/2001 | Balayn et al. | |
| 6,318,668 B1 | 11/2001 | Ulanoski et al. | |
| 6,328,256 B1 | 12/2001 | Ryan et al. | |
| 6,343,768 B1 | 2/2002 | Muldoon | |
| 6,371,406 B1 | 4/2002 | Corcoran | |
| 6,382,559 B1 | 5/2002 | Sutterfield et al. | |
| 6,431,494 B1 | 8/2002 | Kinkead et al. | |
| 6,446,911 B1 | 9/2002 | Yount et al. | |
| 6,457,670 B1 | 10/2002 | Geranio et al. | |
| 6,464,166 B1 | 10/2002 | Yoeli | |
| 6,474,598 B2 | 11/2002 | Carter, Jr. | |
| 6,520,449 B2 | 2/2003 | Illingworth | |
| 6,561,456 B1 | 5/2003 | Devine | |
| 6,568,630 B2 | 5/2003 | Yoeli | |
| 6,607,161 B1 | 8/2003 | Krysinski et al. | |
| 6,619,584 B1 | 9/2003 | Haynes | |
| 6,644,588 B2 | 11/2003 | King et al. | |
| 6,659,394 B1 | 12/2003 | Shenk | |
| 6,704,624 B2 | 3/2004 | Ortega et al. | |
| 6,708,920 B2 | 3/2004 | Fukuyama | |
| 6,745,977 B1 | 6/2004 | Long et al. | |
| 6,751,530 B2 | 6/2004 | Seifert et al. | |
| 6,786,450 B1 | 9/2004 | Einstein | |
| 6,808,140 B2 | 10/2004 | Moller | |
| 6,817,570 B2 | 11/2004 | Yoeli | |
| 6,824,095 B2 | 11/2004 | Mao | |
| 6,834,832 B2 | 12/2004 | Jamgarov | |
| 6,843,447 B2 | 1/2005 | Morgan | |
| 6,848,649 B2 | 2/2005 | Churchman | |
| 6,883,748 B2 | 4/2005 | Yoeli | |
| 6,886,776 B2 | 5/2005 | Wagner et al. | |
| 6,892,979 B2 | 5/2005 | Milde, Jr. | |
| 6,892,980 B2 | 5/2005 | Kawai | |
| 6,913,226 B2 | 7/2005 | Huynh | |
| 6,926,322 B2 | 8/2005 | Browne et al. | |
| 6,974,105 B2 | 12/2005 | Pham | |
| 6,974,106 B2 | 12/2005 | Churchman | |
| 7,188,802 B2 | 3/2007 | Magre | |
| 7,246,769 B2 | 7/2007 | Yoeli | |
| 7,249,732 B2 | 7/2007 | Sanders, Jr. et al. | |
| 7,267,300 B2 | 9/2007 | Heath et al. | |
| 7,275,712 B2 | 10/2007 | Yoeli | |
| D610,066 S | 2/2010 | Au | |
| 7,717,368 B2 | 5/2010 | Yoeli | |
| 7,789,342 B2 | 9/2010 | Yoeli | |
| 7,806,362 B2 | 10/2010 | Yoeli | |
| 7,857,253 B2 | 12/2010 | Yoeli | |
| 7,866,598 B2 | 1/2011 | Waide et al. | |
| 7,871,033 B2 | 1/2011 | Karem et al. | |
| 7,913,947 B2 | 3/2011 | Haynes et al. | |
| 7,938,358 B2 * | 5/2011 | Dietrich | B64C 37/00 |
| | | | 244/2 |
| 8,162,253 B2 | 4/2012 | Seiford, Sr. | |
| 8,210,473 B2 | 7/2012 | Schweighart et al. | |
| 9,259,984 B2 * | 2/2016 | Brown | B60F 5/02 |
| 2002/0161488 A1 | 10/2002 | Guillemin et al. | |
| 2003/0038213 A1 | 2/2003 | Yoeli | |
| 2003/0062442 A1 | 4/2003 | Milde | |
| 2003/0085319 A1 | 5/2003 | Wagner et al. | |
| 2003/0094536 A1 * | 5/2003 | LaBiche | B60F 5/02 |
| | | | 244/2 |
| 2003/0127559 A1 | 7/2003 | Walmsley | |
| 2003/0195673 A1 | 10/2003 | Foch et al. | |
| 2004/0026563 A1 * | 2/2004 | Moller | B64C 3/56 |
| | | | 244/12.4 |
| 2004/0104303 A1 | 6/2004 | Mao | |
| 2004/0149857 A1 | 8/2004 | Yoeli | |
| 2004/0155143 A1 | 8/2004 | Yoeli | |
| 2005/0001092 A1 | 1/2005 | Kisor | |
| 2005/0029407 A1 | 2/2005 | Pohl et al. | |
| 2005/0040283 A1 | 2/2005 | Frazer | |
| 2005/0065669 A1 | 3/2005 | Roux et al. | |
| 2005/0178881 A1 | 8/2005 | Yoeli | |
| 2005/0242231 A1 | 11/2005 | Yoeli | |
| 2006/0113426 A1 | 6/2006 | Yoeli | |
| 2006/0231675 A1 | 10/2006 | Bostan | |
| 2007/0034739 A1 | 2/2007 | Yoeli | |
| 2007/0095971 A1 | 5/2007 | Yoeli | |
| 2007/0158494 A1 | 7/2007 | Burrage | |
| 2008/0054121 A1 | 3/2008 | Yoeli | |
| 2008/0142643 A1 | 6/2008 | Yoeli | |
| 2008/0283673 A1 | 11/2008 | Yoeli | |
| 2009/0084907 A1 | 4/2009 | Yoeli | |
| 2009/0140102 A1 | 6/2009 | Yoeli | |
| 2009/0159757 A1 | 6/2009 | Yoeli | |
| 2010/0051740 A1 | 3/2010 | Yoeli | |
| 2010/0051742 A1 | 3/2010 | Schweighart et al. | |
| 2010/0051753 A1 | 3/2010 | Yoeli | |
| 2010/0076625 A1 * | 3/2010 | Yoeli | B60V 1/043 |
| | | | 701/4 |
| 2010/0230532 A1 | 9/2010 | Dietrich et al. | |
| 2010/0270419 A1 | 10/2010 | Yoeli | |
| 2011/0036939 A1 * | 2/2011 | Easter | B60F 5/02 |
| | | | 244/2 |
| 2011/0042507 A1 * | 2/2011 | Seiford, Sr. | B60F 5/02 |
| | | | 244/2 |
| 2013/0193263 A1 | 8/2013 | Schweighart et al. | |

FOREIGN PATENT DOCUMENTS

| | | |
|---|---|---|
| CN | 102596718 A | 7/2012 |
| CN | 102774493 A | 11/2012 |
| FR | 2622846 | 5/1989 |
| RU | 2016781 | 7/1994 |
| RU | 2016781 C1 | 7/1994 |

(56) References Cited

FOREIGN PATENT DOCUMENTS

| | | |
|---|---|---|
| RU | 2139795 | 10/1999 |
| TW | M418045 U | 12/2011 |
| WO | WO2007114877 | 10/2007 |
| WO | WO-2007114877 A2 | 10/2007 |
| WO | WO-2012012752 A2 | 1/2012 |
| WO | WO 2013181722 A2 * 12/2013 | ............. B60K 16/00 |

OTHER PUBLICATIONS

International Search Report and Written Opinion in PCT/US2007/000256 dated Apr. 7, 2008 13 pages.
International Search Report and Written Opinion in PCT/US2011/045059 dated Mar. 5, 2012 9 pages.
International Search Report and Written Opinion in PCT/US2014/028225 dated Sep. 1, 2014 7 pages.
First Office Action in Chinese Patent Application No. 201480021624.X dated Aug. 3, 2016 9 pages.
Second Office Action in Chinese Patent Application No. 201480021624.X dated Dec. 1, 2016 14 pages.
The Chinese Office Action dated Feb. 12, 2018 for Chinese patent application No. 201480021624.X, a counterpart foreign application of U.S. Appl. No. 14/777,247, 13 pages.

* cited by examiner

COMBINED FLYING/DRIVING VEHICLE WITH VERTICAL TAKEOFF AND FIXED-WING CRUISE CAPABILITIES

CROSS-REFERENCE TO RELATED APPLICATION

This application is a United States National Stage of International Application No. PCT/US2014/028225, filed on Mar. 14, 2014, which claims the benefit of U.S. Provisional Application No. 61/790,763, filed on Mar. 15, 2013; the entire disclosure of each of these applications is incorporated by reference herein in its entirety.

TECHNICAL FIELD

The present invention relates generally to combined flying/driving vehicles, otherwise known as flying cars and, more specifically, to a flying car having foldable wings and rotatable propulsion devices that is capable of vertical take-off and landing (VTOL).

BACKGROUND

Flying cars have been invented which successfully achieve both objectives of flying and driving. For example, U.S. Pat. No. 7,938,358 to the present inventor and owned by Terrafugia, Inc. discloses a flying and driving vehicle that includes a foldable main wing mounted to a fuselage using a sophisticated folding mechanism and separate propulsion systems for driving and for flying. U.S. Pat. No. 7,857,253 describes a ducted-fan vehicle capable of vertical takeoff and landing (VTOL), but it is unable to drive legally on roads. While U.S. Pat. No. 8,162,253 purports to describe a vehicle for the road, the air, and water that is VTOL capable, one of ordinary skill in the art would understand the complexity of the design and the aerodynamic issues expected to be caused by the design to present significant challenges.

Therefore, it is desirable to provide a vehicle that is capable of legally operating on a roadway surface, of VTOL-type flying, and of fixed wing cruise. This is particularly important in highly regulated industries such as the aviation and automotive industries, as new vehicle inventions have much greater value if they can be made to work within the existing regulatory structure.

SUMMARY OF THE INVENTION

The embodiments described herein distinguish themselves from the prior art by the unique configuration and system architecture which enable a mode of transportation with a very high level of safety and reliability in addition to new capabilities.

It is one objective of this invention to provide an improved means of personal transportation by creating in one embodiment a plug-in-hybrid, vertical takeoff and landing ("VTOL"), combined flying-driving vehicle that is capable of: carrying four people, driving safely at high speeds on the ground like a car, parking in a standard construction single car garage, flying safely at high speeds in the air using fixed-in-flight but foldable wings, and taking off and landing vertically or substantially vertically with only simple high level direction from the operator.

According to a first aspect, the invention relates to a combined flying-driving vehicle. In some embodiments, the combined flying-driving vehicle includes a vehicle body having a passenger compartment with a front end and an aft end, wherein the vehicle body defines a longitudinal axis along a length thereof substantially parallel to a preferred direction of motion of the vehicle along a length thereof; a plurality of wheels coupled to the body and configured to support the vehicle body on ground; a ducted fan mounted proximate the aft end of the body, wherein the ducted fan defines a fan axis substantially parallel to the longitudinal axis; at least two folding wings coupled to the body, wherein the folding wing are adapted to fold around wing folding axes substantially parallel to the longitudinal axis, and wherein the folding wings are adapted to transmit lift to the body during flight and provide less lift when folded; a plurality of pods, e.g., at least one electric motor, pivotably mounted to the folding wings; and a plurality of propeller blades pivotably mounted to the pods. In one variation, each propeller blade is mounted about an axis substantially parallel to a root chord of the blade.

In variations of the embodiment, the wheels may be adapted to be retracted into the body during flight; a steering wheel may be adapted to turn the vehicle; an accelerator pedal may be adapted to accelerate the vehicle; and/or a brake pedal may be adapted to decelerate the vehicle. In other variations, the combined flying-driving vehicle further includes at least one of an electric motor and a hydrocarbon fuel engine, which may be adapted to power the ducted fan and/or recharge batteries to power one or more electric motors; and pod doors may be provided on sides of the vehicle body to enclose the pods when the wings are folded. In some implementations, the pods are adapted to pivot about pivot locations proximate a vertical and longitudinal center of gravity of the vehicle. The steering wheel, the accelerator, and/or the brake pedal may be functional to operate the vehicle in both flying and driving modes.

In further variations, the combined flying-driving vehicle further includes at least one digital computer and at least one power source adapted to stabilize and control the vehicle. In one implementation, the at least one digital computer is wirelessly networked to a data source including data about at least one of real-time traffic, weather, and airspace. In another implementation, the digital computer is adapted to interpret high level commands from the operator to operate the vehicle substantially autonomously.

According to a second aspect, the invention relates to a combined flying-driving vehicle. In some embodiments, the combined flying-driving vehicle includes a vehicle body having a passenger compartment and a storage compartment, the vehicle body having a longitudinal axis that is substantially parallel a preferred direction of motion of the vehicle; a pair of wings that are mounted to the vehicle body with each of the pair of wings disposed on a first side or an opposing second side of the vehicle body and wherein the wings are structured and arranged to transmit lift to the vehicle in flight and less lift to the vehicle when driving; a wing deployment mechanism configured to deploy the wings in one of a stored position and a flight position, wherein the wing deployment mechanism includes an actuator for rotating the wings between the stored position and the flight position and a locking mechanism for securing the wings in one of the stored position or the flight position; a plurality of wheels configured to support the vehicle on the ground; a first propulsion system configured to provide motive force to the vehicle on the ground and wherein the first propulsion system is adapted to provide a torque to at least one of the plurality of wheels; a second propulsion system configured to provide motive force for propelling the vehicle body while in flight, wherein the second propulsion system includes an apparatus for accelerating an airflow in a direction parallel or substantially parallel to the longitudinal axis; and a third propulsion system configured to provide motive force for propelling the vehicle, wherein the third propulsion system includes an apparatus for accelerating an airflow in a direction perpendicular or substantially perpendicular to the longitudinal axis to move the vehicle in a vertical or substantially vertical direction when the wings are in the flight position. In other variations, the combined flying-driving vehicle may further include: at least one independent machine that is mechanically coupled to the second propulsion system for generating electrical power; a plurality of battery packs for providing electrical power to any of the propulsion systems; a power conditioner for conditioning power between the plurality of battery packs and the independent machine; and/or a controller for managing electrical and mechanical power generated by any of the propulsion systems.

In some variations of the embodiment, the first propulsion system is a mechanical engine, e.g., a fuel-cell powered motor and/or a hydrocarbon-powered engine, that is adapted to rotate a drive shaft. Alternatively, the first propulsion system includes at least one in-wheel electric motor, each of the at least one in-wheel electric motors mechanically attached to a corresponding wheel of the plurality of wheels. An independent machine may also be mechanically coupled to the drive shaft for generating electrical power from mechanical power or for generating mechanical power from electrical power.

In other variations, the second propulsion system is a ducted fan disposed near an aft end of the vehicle with a fan axis that is substantially parallel to the longitudinal axis. In some implementations, the ducted fan is mechanically coupled to the drive shaft associated with the first propulsion system.

In still other variations, the third propulsion system includes a first pod-mounted motor that is pivotably mounted to a first wing on a first side of the vehicle body and a second pod-mounted motor that is pivotably mounted to a second wing on a second side of the vehicle body; and a plurality of propeller blades that are pivotably mounted to each of the pod-mounted motors about an axis that is substantially parallel to the root chord of the propeller blade. In some implementations, the pod-mounted motors are adapted to pivot about pivot locations proximate a vertical and longitudinal center of gravity of the vehicle. In other implementations, the pod-mounted motors are adapted to pivot about pivot locations while the wings remain in the flight position. Pivot locations of the pods may be positioned proximate a vertical and longitudinal center of gravity of the vehicle. The center of gravity of the pods may be positioned proximate to the pivot axis of the pods.

Each of the plurality of propeller blades may be powered by at least one independently-controlled electric motor. Moreover, each of the independently-controlled electric motors is electrically coupled to a battery pack and may be electronically coupled to a motor controller. Advantageously, when in the stored position, the third propulsion system is adapted to be enclosed within the vehicle body by pod doors located on the first and second sides of the vehicle body.

In some embodiments, the wheels can be retracted into the body for flight. In some embodiments, the wings are mounted to an upper portion of the vehicle body. In some embodiments, the vehicle may be accelerated with an accelerator pedal and may be slowed or stopped with a brake pedal. One or more digital computers with at least one power source may be used to stabilize and control the vehicle. The digital computers may be wirelessly networked to a source of data about real-time traffic, weather, and airspace. In some embodiments, the computer may interpret high level commands from the operator, enabling the vehicle to be a pilotless air taxi.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

The invention may be better understood by reference to the following detailed description, taken in conjunction with the figures. Various embodiments of the invention relate to a combined flying-driving vehicle. Other configurations and variants will be apparent to those skilled in the art from the teachings herein.

One embodiment of the invention is a vehicle as shown in the images with a fuselage/body and a ducted fan at the aft end and folding wings on either side of the body with pod-mounted wingtip electric motors or "pods." The wings (e.g., a pair of wings) may be disposed on an upper portion of the vehicle body and, moreover, each of the wings may be structured and arranged to fold down along the side of the body, which allows the vehicle to fit inside a single car garage and legally within a single lane of traffic for driving. With the wings in a stored position, i.e., a car or driving configuration, the pod-mounted motors or pods are protected from road debris and other causes of damage by sliding doors on the body of the vehicle.

Combined Flying-Driving Vehicle

Figure 12:
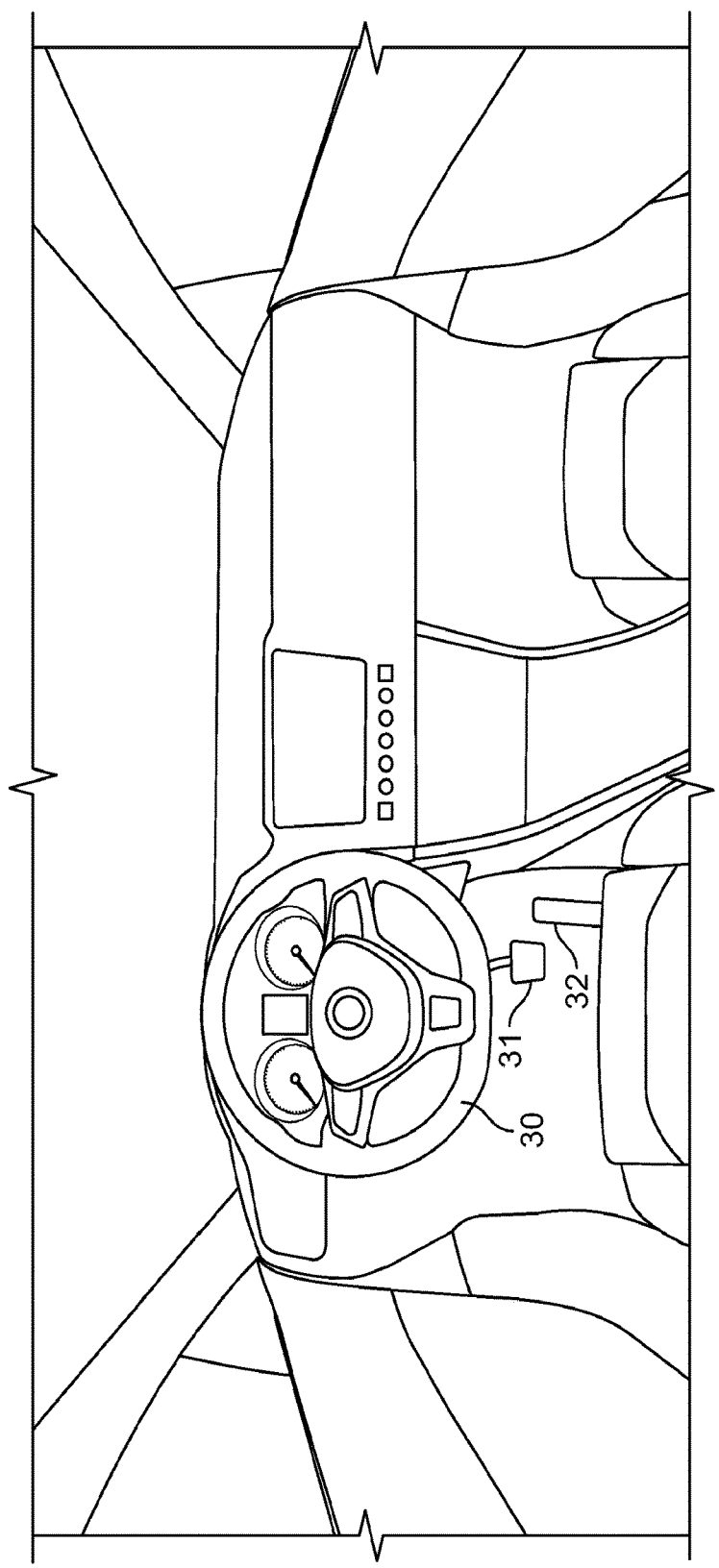
FIG. 12 is a schematic front interior view of a passenger compartment with a steering wheel, acceleration pedal, and brake pedal for operating the combined flying-driving vehicle of FIG. 1, in accordance with one embodiment of the present invention.

Referring to FIGS. 1-5, illustrative embodiments of a combined flying-driving vehicle with the wings deployed for a flight mode of operation are shown. The vehicle 100 includes an elongate fuselage/vehicle body 1 with a forward end 26 and an aft end 27. The elongate body 1 has a longitudinal axis 25 that is parallel or substantially parallel to a preferred direction of motion 29 of the vehicle 100. A plurality of wheels 7 can provide propulsion to the vehicle 100 during a ground mode of operation (i.e., during driving). The wheels 7 may be driven by in-wheel electric motors and/or a mechanically-driven drive shaft. Advantageously, the wheels 7 may also provide advanced traction control and used with an anti-lock braking system ("ABS"). Referring to FIG. 12, the vehicle 100 may be steered using a standard steering wheel 30. Acceleration may be controlled using an accelerator pedal 32, while deceleration and stopping functions may be controlled using a brake pedal 31.

Figure 10:
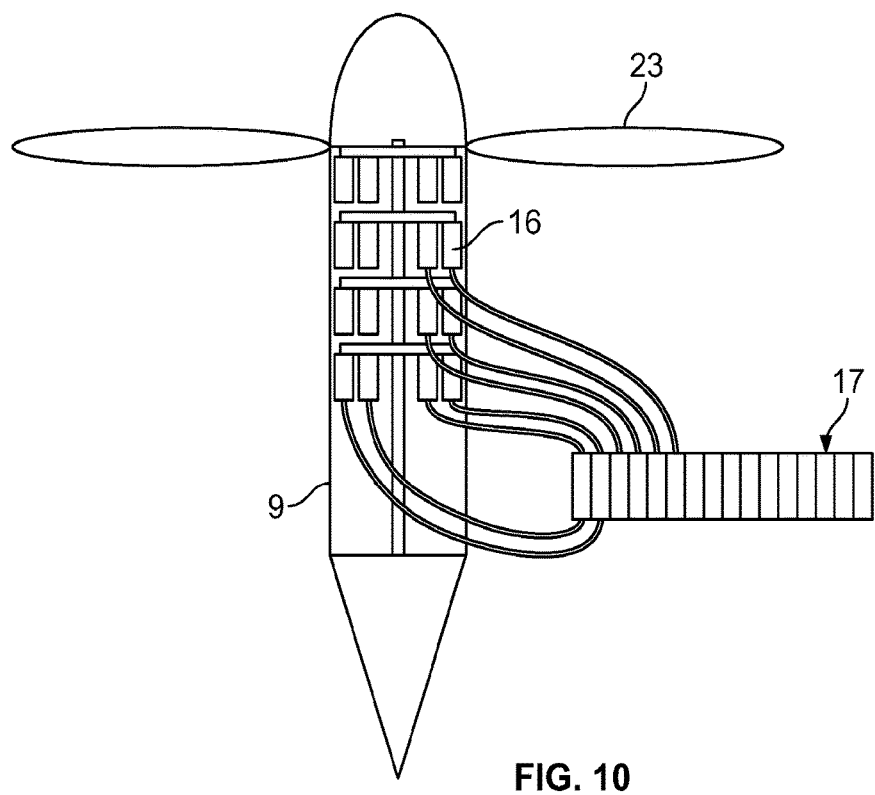
FIG. 10 is a schematic top cross-section of the pod-mounted motor of FIG. 7 including independently-controlled electric motors and battery packs, in accordance with one embodiment of the present invention.

A folding or foldable wing 3 (e.g., a pair of wings) may be disposed on either side of the vehicle body 1, e.g., on an upper portion of the vehicle body 1. An actuator 28 is provided to rotate the wings 3 about axes parallel to a longitudinal axis 25 of the vehicle 100, to place the wings 3 in either a stored position or a flight position. A locking mechanism 24 is provided to fixedly secure each of the wings 3 in either the stored position or the flight position. A motor 16 (e.g., an electric motor as depicted in FIG. 10) contained in a pod 9 may be disposed proximate a wingtip on each of the wings 3 to provide vertical takeoff and landing (VTOL) capability during a flight mode of operation, as well as to provide some horizontal propulsion during a flight mode of operation. Each of the wingtip pods 9 may include a propeller fan 23 having a plurality of foldable propeller blades 10. In a variation, each propeller blade 10 is mounted/hinged about an axis substantially parallel to a root chord 33 (FIG. 3) of the propeller blade 10. Each propeller blade 10 may be sprung to a folded position. A ducted fan 2 disposed at the aft end 27 of the vehicle 100 may provide horizontal propulsion during the flight mode of operation.

Driving (Stored Wing Position) Mode of Operation

Figure 6:
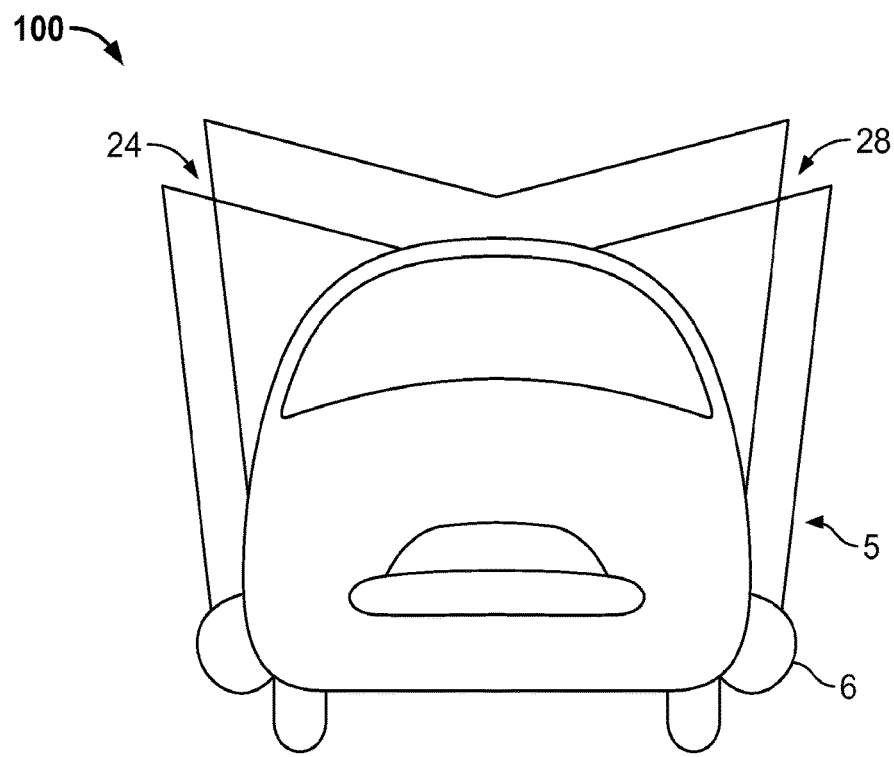
FIG. 6 is a schematic front view of the combined flying-driving vehicle of FIG. 1 with the wings in a stored position, in accordance with one embodiment of the present invention.

Referring to FIG. 6, an illustrative embodiment of the vehicle 100 in a driving mode of operation is shown. When in the driving mode, the wings 3 are securely locked in a stored position. This driving configuration allows the vehicle 100 to fit inside a single car garage and to operate legally in a single lane of traffic when being driven. In one embodiment, to place the vehicle 100 in the driving mode of operation, first, the pod doors 6 on both sides 5 of the vehicle body 1 are opened. The doors 6 may be manually or electrically actuated to open and to close. With the doors 6 opened, after disengaging the locking mechanism 24 holding the wings 3 in the flight position, each of the pair of wings 3 may be individually rotated, e.g., using an actuator 28, to fold down along opposing sides 5 of the vehicle body 1. To maintain stability and prevent the vehicle 100 from tipping over, the wings 3 may be rotated at the same time. Once the wings 3 are deployed in the stored position, the locking mechanism 24 may be re-engaged to securely fix the wings 3 in the stored position. Once locked in position, the pod doors 6 may be closed. With the pod doors 6 closed and with the wings 3 in the stored position, the pod doors 6 cover the pods 9, the motors 16, and the propeller blades 10, which may be stowed alongside the pods 9 and motors 16. While in the stored position, the sliding doors 6 protect the pods 9, the motors 16, and the propeller blades 10 from road debris and other causes of damage.

Flying (Flight Wing Position) Mode of Operation

Figure 7:
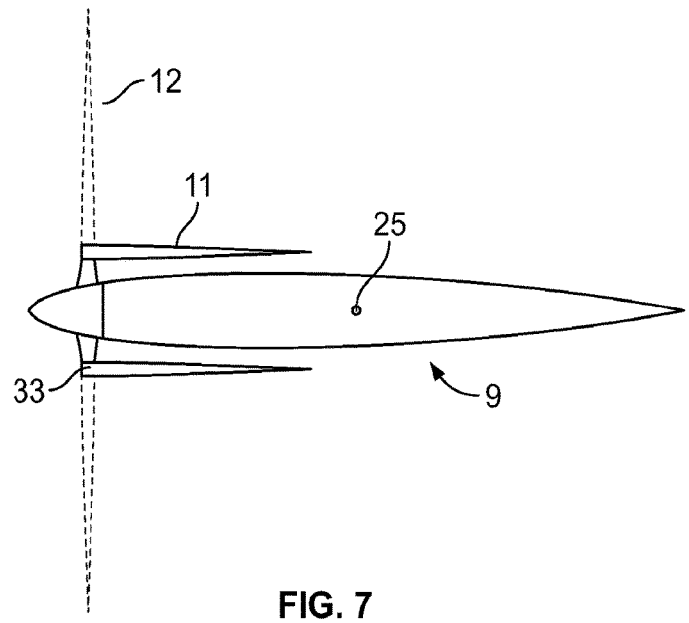
FIG. 7 is a schematic side view of a pod-mounted motor with propeller blades, in accordance with one embodiment of the present invention.
Figure 8:
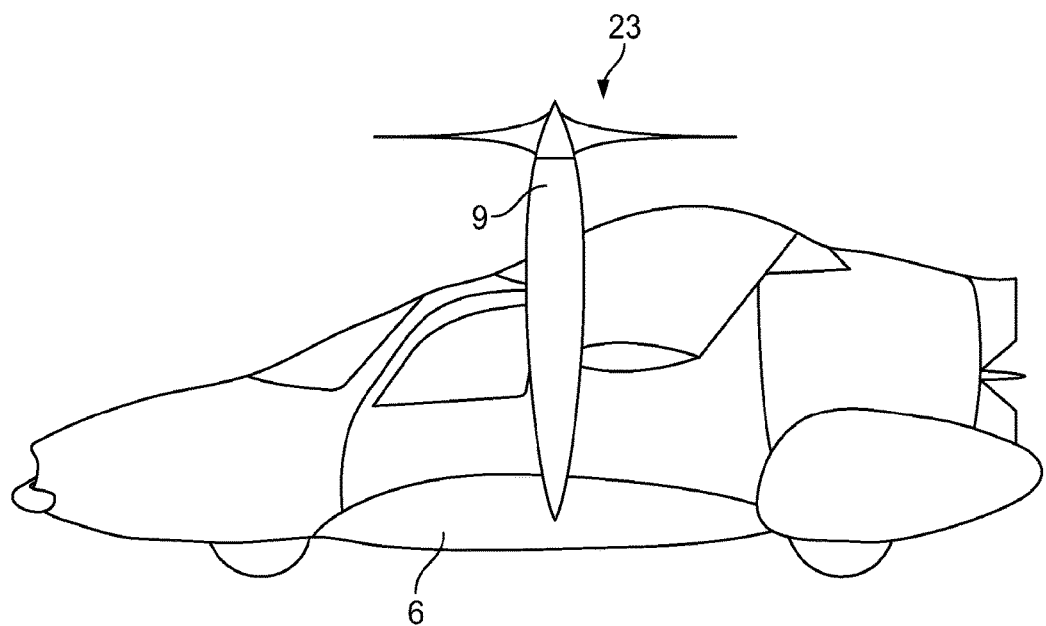
FIG. 8 is a schematic side view of the combined flying-driving vehicle of FIG. 1 with the wings deployed in a flight position and with the pod-mounted motors of FIG. 7 rotated for vertical takeoff or landing, in accordance with one embodiment of the present invention.

Changing the vehicle 100 from the previously described wings stored/driving mode of operation to a flight position/flying mode of operation is essentially the opposite of the storing process described above. First, the pod doors 6 are opened. The locking mechanism 24 may then be disengaged, allowing the actuator 28 to rotate the wings 3 to deploy them to their flight position, at which point the locking mechanism 24 is re-engaged. To reduce aerodynamic drag in flight, the pod doors 6 can be closed again once the pods 9 and wings 3 are deployed. Referring to FIG. 7, preferably, the wings 3 are extended to a position that aligns the pod motor pivot point 25 with the center of gravity of the vehicle 100. The pods 9 may be balanced around their pivot points 25 to minimize changes to the vehicle center of gravity as the pods 9 move from a horizontal orientation (FIG. 1) to a vertical orientation (FIG. 8). When the pod-mounted motors 16 on the wing tip are pivoted in a substantially vertical direction (FIG. 8), they provide a VTOL capability. In a horizontal or substantially horizontal position (FIG. 1), the pod-mounted motors 16 are adapted to accelerate the vehicle 100 to cruise speed in the air.

Each electric motor 16 may be adapted to rotate a multiple-blade, e.g., six blade, adjustable pitch, folding propeller fan 23. As shown in FIG. 7, the propeller blades 10 may be biased toward a folded or stowed position 11 in which the propeller blades 10 are folded back along the length of the motor 16 and the pod 9. Centrifugal loads resulting from spinning up of the motors 16 can cause the propeller blades 10 to automatically unfold into an unfolded position 12. During cruise flight, when the motors 16 are not generating torque, the propeller blades 10 may then be automatically folded 11 against the pods 9 to reduce aerodynamic drag (e.g., with a biasing element such as a spring). The pod 9 may extend far enough in front of the pivot point 25 to allow the propeller blades 10 to fold back without contacting the pivot or mounting mechanisms.

Horizontal Flight Mode of Operation

Figure 9:
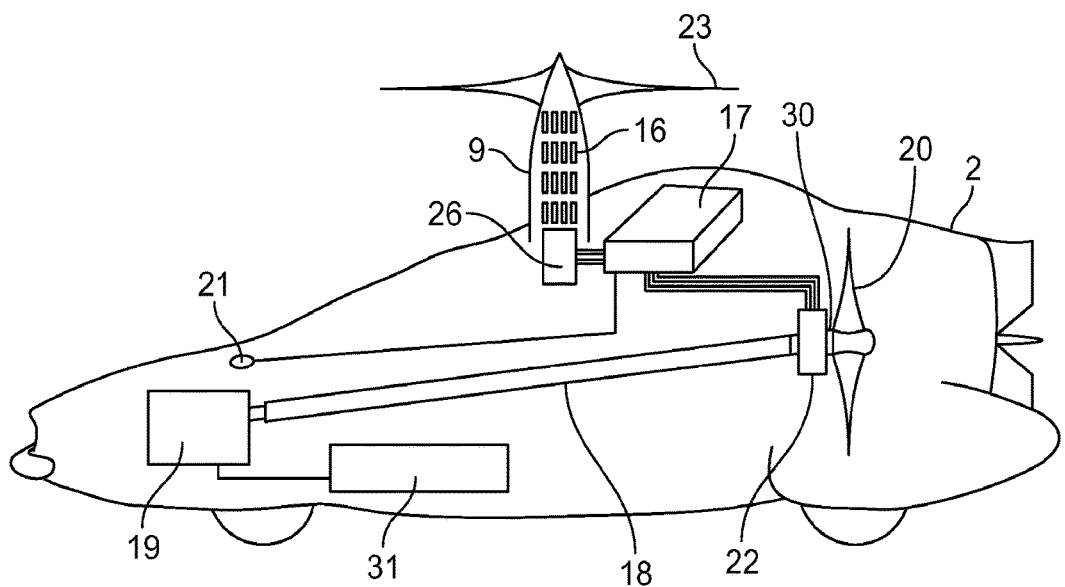
FIG. 9 is a schematic semi-transparent side view of multiple propulsion systems for the combined flying-driving vehicle depicted in FIG. 8, in accordance with one embodiment of the present invention.

Referring to FIG. 9, the ducted fan 2 at the aft end 27 of the vehicle 100 provides a primary source of horizontal cruise thrust. The ducted fan 2 can be driven mechanically by a drive shaft 18 that is primarily powered by a hydrocarbon engine or fuel cell-powered motor 19 that may be coupled with a fuel tank 31. As a back-up, a plurality of machines 22, e.g., motor/generators, that are electrically coupled to a plurality of battery packs 17 may be provided to transform electrical power from the battery packs 17 into mechanical power via the drive shaft 18.

Figure 1:
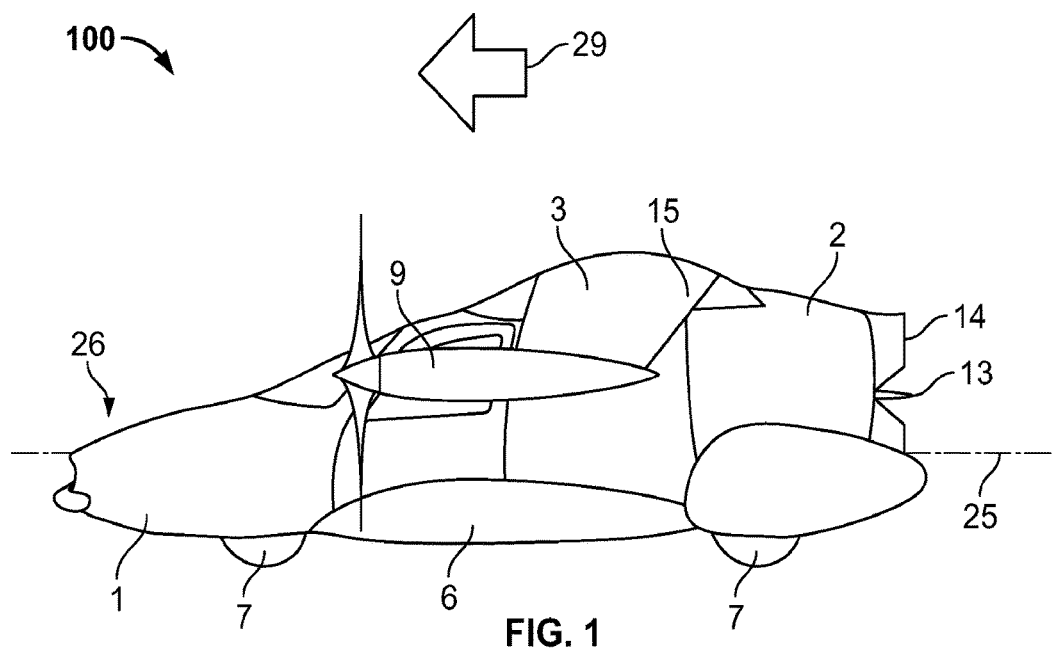
FIG. 1 is a schematic side view of a combined flying-driving vehicle with the wings deployed in a flight position, in accordance with one embodiment of the present invention.
Figure 2:
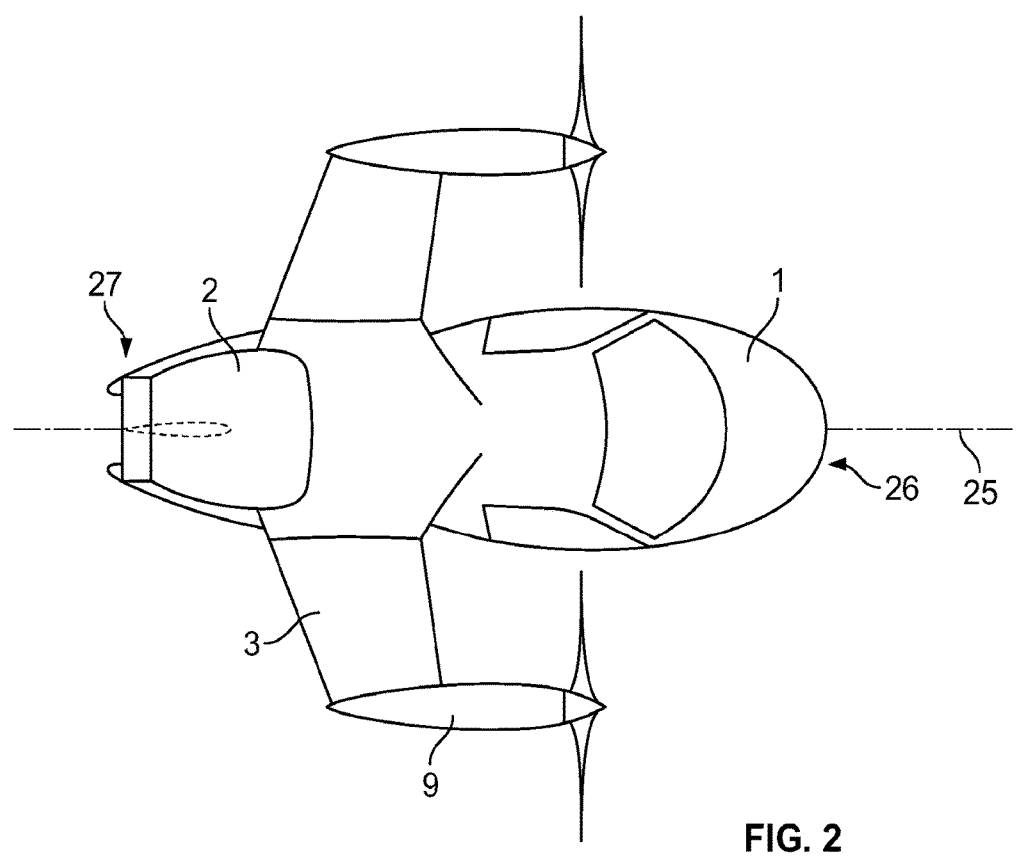
FIG. 2 is a schematic top view of the combined flying-driving vehicle of FIG. 1 with the wings deployed in a flight position, in accordance with one embodiment of the present invention.
Figure 3:
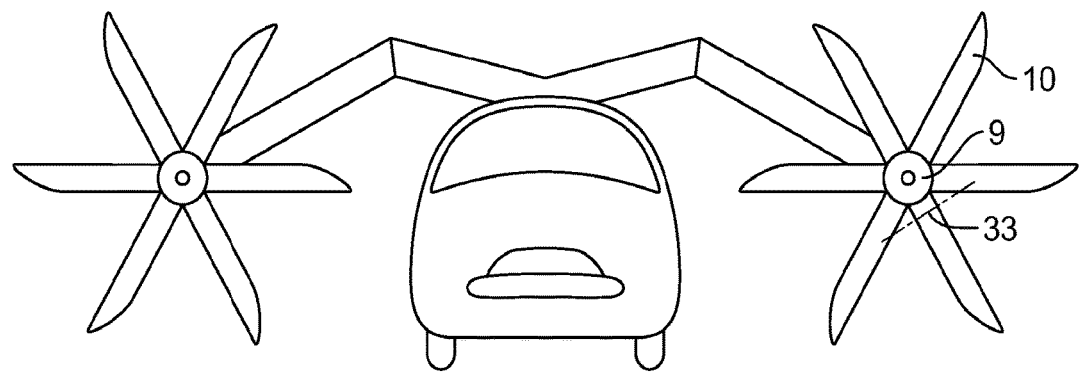
FIG. 3 is a schematic front end view the combined flying-driving vehicle of FIG. 1 with the wings deployed in a flight position, in accordance with one embodiment of the present invention.
Figure 4:
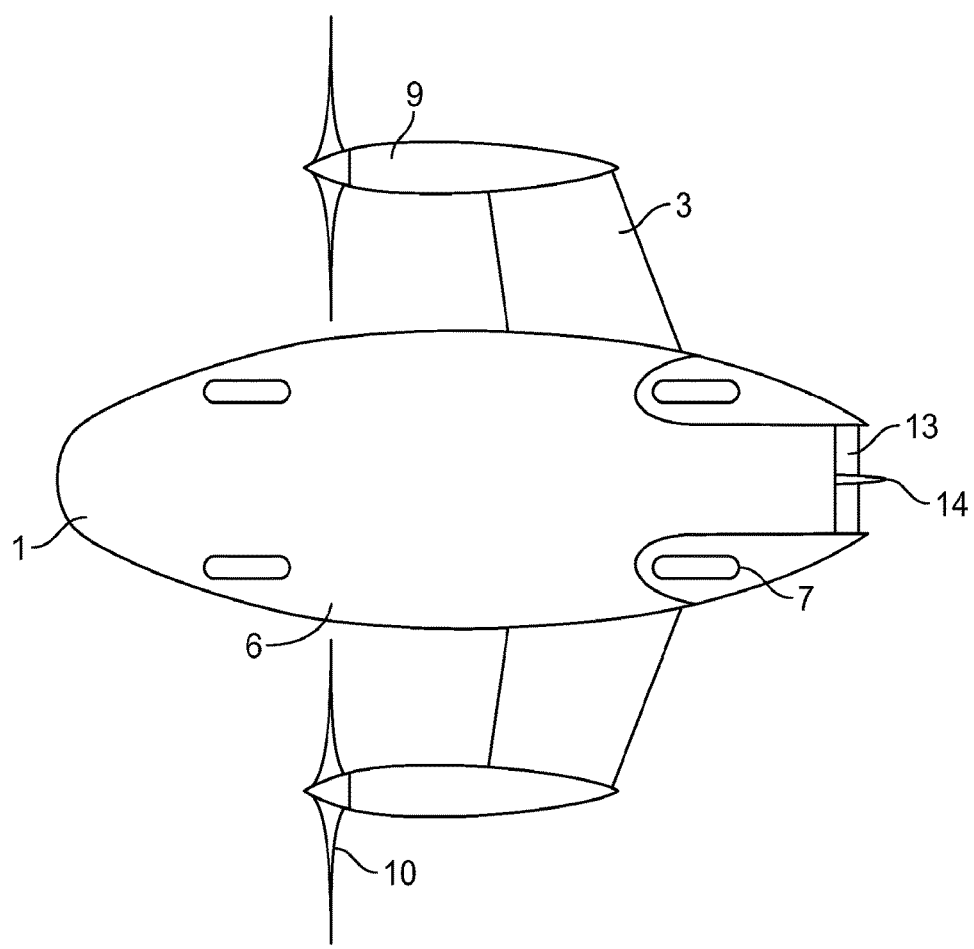
FIG. 4 is a schematic bottom view of the combined flying-driving vehicle of FIG. 1 with the wings deployed in a flight position, in accordance with one embodiment of the present invention.
Figure 5:
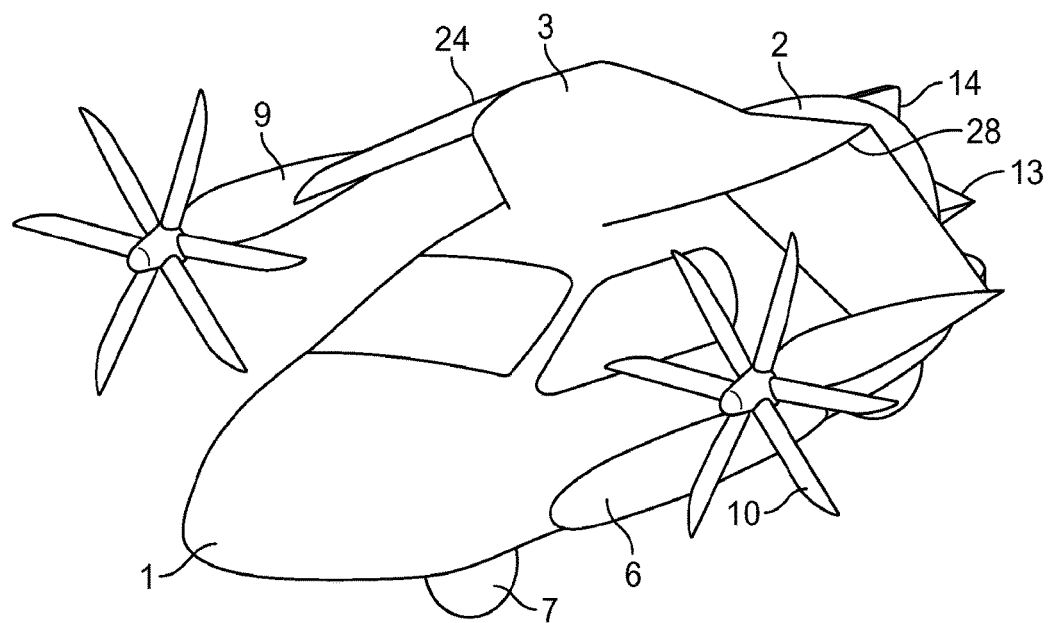
FIG. 5 is a schematic front isometric view of the combined flying-driving vehicle of FIG. 1 with the wings deployed in a flight position, in accordance with one embodiment of the present invention.

Referring to FIG. 1, during a horizontal flight mode of operation, primary pitch and primary yaw control may be achieved through actuated vanes 13 and 14, respectively, that are disposed downstream of the ducted fan 2. Primary roll control can be achieved through elevons 15 on the trailing edge of the wings 3. Backup roll control may be achieved through independent tilting actuation of the pods 9. Backup pitch control may be achieved through redundant actuators on the pitch vane 13, which are capable of back-driving the primary actuators 13, and tertiarily through the elevons 15 and/or pods 9. Backup yaw control may be achieved by independently throttling the electric motors 16 in the pods 9.

Vertical Flight Mode of Operation

Figure 11:
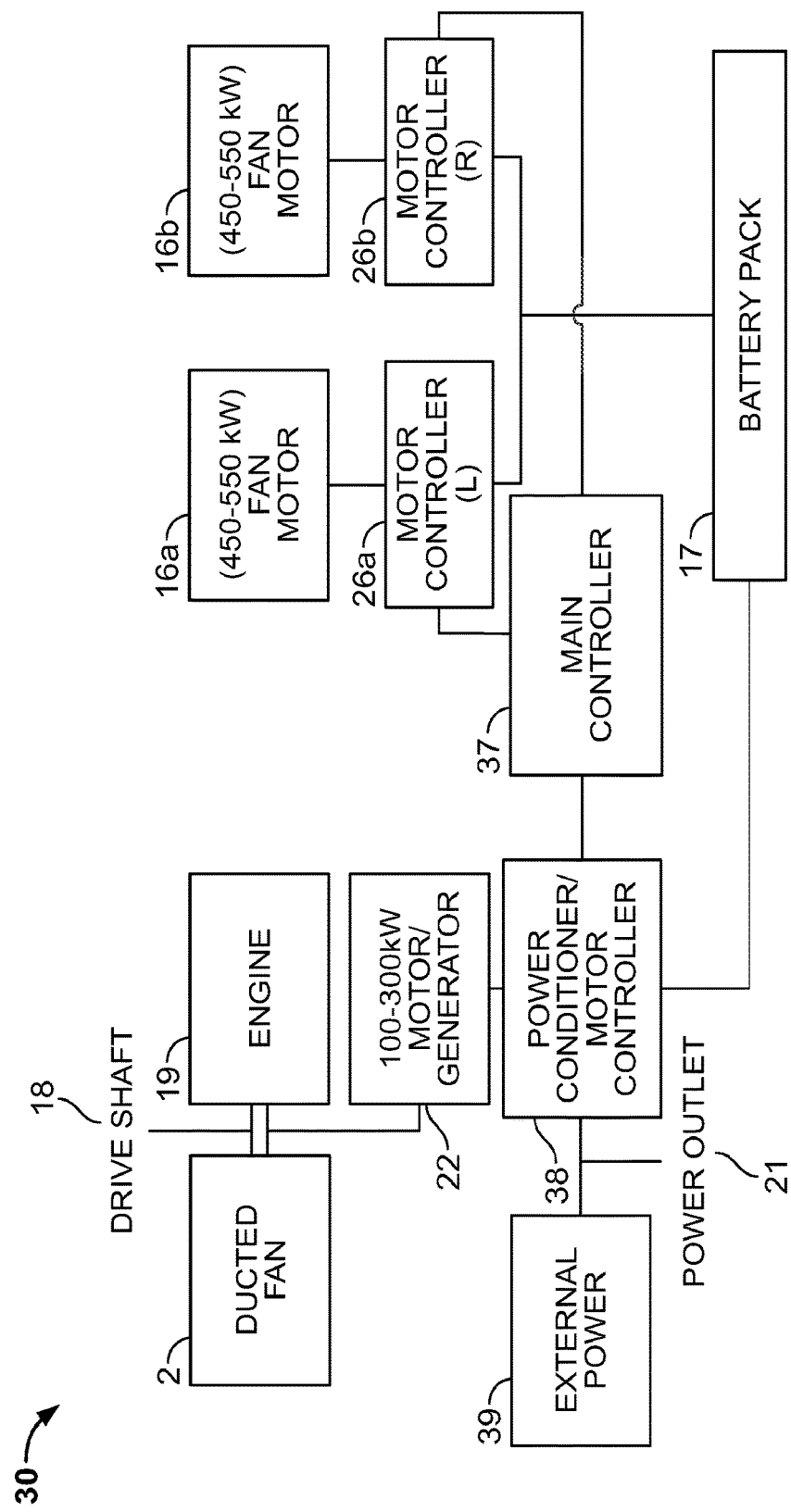
FIG. 11 is a block diagram of the power and control management system, in accordance with one embodiments of the present invention.

Although they may be used for horizontal flight as well, the primary function of the wingtip, pod-mounted motors 16 is to provide a VTOL capability. For example, as shown in FIGS. 10 and 11, each pod 9 may include a motor 16 having a plurality of, e.g., sixteen, independent brushless DC (BLDC) electric motors 16, each having its own computer-controlled motor controller 26a, 26b. A plurality of battery packs 17, e.g., 32, independent Lithium Polymer (LiPo) battery packs (each with approximately 100 3.7 Volt cells), may be structured and arranged to drive the 32 BLDC electric motors 16 that spin the two wing-tip mounted fans 23. Advantageously, the battery packs 17 can be charged during cruise flight or while driving on the ground by a plurality of, e.g., sixteen, independent motor/generators 22 that tap excess mechanical power off the primary driveshaft 18 between the engine 19 and the propeller 20 of the ducted fan 2 and generate electrical power that can be stored in the battery packs 17. When the vehicle 100 is operating on the ground, while driving or while stopped, the ducted fan 2 may be disengaged from the driveshaft 18, e.g., using a clutch, to allow the motor/generators 22 to charge the battery packs 17 without spinning the fan propeller 20. Additionally, the battery packs 17 may also be charged while stationary on the ground using plug-in outlet power or through resonant coupling (e.g. as developed by WiTricity Corp. (Watertown, Mass.)).

During a vertical flight mode of operation, primary pitch and primary yaw control may still be achieved through actuated vanes 13 and 14, respectively, that are disposed downstream of the ducted fan 2. Thrust generated by the ducted fan 2 in the forward direction 29 while providing airflow over vanes 13 and 14 for directional control can be cancelled out by tilting the propellers 23 slightly towards the aft end 27 of the vehicle to prevent unwanted forward motion during a vertical takeoff, while maintaining the ability to control the vehicle in pitch and yaw. Primary roll control can be achieved through differential thrust from the motors 16 in the pods 9 on opposing sides of the vehicle. Backup yaw control may be achieved through independent tilting actuation of the pods 9. Backup pitch control may be achieved through redundant actuators on the pitch vane 13, which are capable of back-driving the primary actuators 13.

The hybrid highly parallelized electric architecture not only provides a very high level of system redundancy and reliability, but also leverages the strength of each propulsion technology. More specifically, primary electrical and mechanical power may be provided, respectively, by the battery pack 17 and the motor/engine 19, e.g., a hydrocarbon engine or fuel cell powered motor. The system is configured so that excess mechanical power generated by the motor/engine 19 can be converted to electrical power for charging the battery packs 17. In the event of a failure of the hydrocarbon engine 19, the battery packs 17 can provide electrical power to the electric motor/generators 22, which are mechanically coupled to the drive 18 shaft, to power the vehicle 100 to a safe landing.

As previously mentioned, each pod 9 can include a motor 16, e.g., a an electric fan motor between approximately 450 kW and 550 kW (although motors above and below this range are possible), including a 460 kW motor, that includes a plurality of, e.g., sixteen or 32, independent BLDC electric motors 16a, 16b, each of which may have its own computer-controlled motor controller 26a, 26b. Each of the motor controllers 26a, 26b may be electrically coupled to one of a corresponding plurality of, e.g., sixteen or 32, independent LiPo battery packs 17, e.g., each with approximately 100 3.7 Volt cells, that are adapted to drive the plurality of, e.g., sixteen or 32, BLDC electric motors 16a, 16b, which produce torque for rotating the wing-tip mounted rotors 23 (e.g., two rotors 23).

The motor/engine 19, e.g., a 400-Horsepower hydrocarbon engine or fuel cell powered motor, can provide mechanical power to a drive train, e.g., a drive shaft 18, for rotating the wheels 7 of the vehicle 100 for roadway operation and/or for rotating the propeller 20 of the ducted fan 2 while in flight. The motor/engine 19 and drive shaft 18 are mechanically coupled to a plurality of, e.g., sixteen, independent machines 22 (e.g., motor generators in the range of 100-300 kW (although motor generators above and below this range are possible), including 200 kW motor generators), which can be adapted to tap excess mechanical power off the primary drive shaft 18 between the motor/engine 19 and the ducted fan 2 and/or to tap excess electrical power from the battery pack 17. Thus, during operation, the machines 22 may function as generators, producing electrical power from any excess mechanical power generated, with any excess electrical power stored in the battery packs 17, or the machines 22 may function as motors so that electrical power from the battery packs 17 can be converted into mechanical power for driving the drive shaft 18 and the propeller 20 of the ducted fan 2. Whether the machines 22 operate as motors or as generators, a power conditioner/motor controller 38 can be provided to ensure that the flow of electricity does not damage the battery packs 17 or the machines 22. The power conditioner/motor controller 38 may also be electrically coupled to an external power source 39, e.g., a private or public utility network, via the power outlet 21 for charging the battery packs 17. Accordingly, the battery packs 17 can be charged while the vehicle 100 is stationary on the ground by plug-in outlet 21 or through resonant coupling, as described above.

A main controller 37 may be a commercially-available processor such as an Intel Core, Motorola PowerPC, MIPS, UltraSPARC, or Hewlett-Packard PA-RISC processor or any type of processor or controller as many other processors, microprocessors, ASICs, and controllers are available. The controller 37 is structured and arranged to perform a series of instructions, e.g., an application, an algorithm, a driver program, and the like, that result in manipulated data to control operation of the power conditioner/motor controller 38 and each of the plurality of, e.g., 16 or 32, computer-controlled motor controllers 26a, 26b.

The on-board interface computer 37 may accept high level verbal and touch screen input commands from the onboard operators, such as "take me to 77 Massachusetts Avenue, Cambridge, Mass.", "takeoff now", and "land here." The on-board computer 37 may rely on the operator to verify the safety of operations near the ground, but is capable of landing the vehicle 100 at an operator selected location. The on-board computer 37 can communicate with Air Traffic Control (ATC), e.g., via a radio and/or digital datalink system, and can receive information about other air traffic and weather patterns from the Automatic Dependent Surveillance-Broadcast (ADS-B) system which allows the computer 37 to plot 4D trajectories, file flight plans, and execute flights all without requiring the operator to have any knowledge of airspace, air traffic, or weather restrictions. The vehicle 100 can be stabilized in flight via redundant computer driven feedback control loops.

Various embodiments and features of the present invention have been described in detail with particularity. The utilities thereof can be appreciated by those skilled in the art. It should be emphasized that the above-described embodiments of the present invention merely describe certain examples implementing the invention, including the best mode, in order to set forth a clear understanding of the principles of the invention. Numerous changes, variations, and modifications can be made to the embodiments described herein and the underlying concepts, without departing from the spirit and scope of the principles of the invention. All such variations and modifications are intended to be included within the scope of the present invention, as set forth herein. The scope of the present invention is to be defined by the claims, rather than limited by the forgoing description of various preferred and alternative embodiments. Accordingly, what is desired to be secured by Letters Patent is the invention as defined and differentiated in the claims, and all equivalents.

What is claimed is:

1. A combined flying-driving vehicle comprising:
   a vehicle body comprising a passenger compartment comprising a front end and an aft end, wherein the vehicle body defines a longitudinal axis along a length thereof substantially parallel to a preferred direction of motion of the vehicle along a length thereof;
   a plurality of wheels coupled to the body and configured to support the vehicle body on ground;
   a ducted fan disposed at the aft end of the body, wherein the ducted fan defines a fan axis substantially parallel to the longitudinal axis;
   at least two folding wings coupled to the body, wherein the folding wing are adapted to fold around wing folding axes substantially parallel to the longitudinal axis, and wherein the folding wings are adapted to transmit lift to the body during flight and provide less lift when folded;
   a plurality of pods pivotably mounted to the folding wings; and
   a plurality of propeller blades pivotably mounted about a folding axis to the pods.

2. The combined flying-driving vehicle of claim 1, wherein the wheels are adapted to be retracted into the body during flight.

3. The combined flying-driving vehicle of claim 1, wherein each pod comprises at least one electric motor.

4. The combined flying-driving vehicle of claim 1 further comprising at least one of an electric motor and a hydrocarbon fuel engine adapted to power the ducted fan.

5. The combined flying-driving vehicle of claim 1 further comprising a steering wheel adapted to turn the vehicle.

6. The combined flying-driving vehicle of claim 1 further comprising an accelerator pedal adapted to accelerate the vehicle during flight.

7. The combined flying-driving vehicle of claim 1 further comprising a brake pedal adapted to decelerate the vehicle during flight.

8. The combined flying-driving vehicle of claim 1 further comprising at least one digital computer with at least one power source adapted to stabilize and control the vehicle.

9. The combined flying-driving vehicle of claim 8, wherein the at least one digital computer is wirelessly networked to a data source comprising data about at least one of real-time traffic, weather, and airspace.

10. The combined flying-driving vehicle of claim 8, wherein the digital computer is adapted to interpret high level commands from the operator to operate the vehicle substantially autonomously.

11. The combined flying-driving vehicle of claim 1 further comprising pod doors on sides of the vehicle body adapted to enclose the pods when the wings are folded.

12. The combined flying-driving vehicle of claim 1, wherein the pods are adapted to pivot about pivot locations substantially aligned with a vertical and longitudinal center of gravity of the vehicle.

13. The combined flying-driving vehicle of claim 1, wherein each propeller blade is pivotably mounted about an axis substantially parallel to a root chord of the propeller blade.

14. A combined flying-driving vehicle comprising:
   a vehicle body comprising a passenger compartment comprising a front end and an aft end, wherein the vehicle body defines a longitudinal axis along a length thereof substantially parallel to a preferred direction of motion of the vehicle along a length thereof;
   at least one motor;
   a plurality of wheels coupled to the body and in a drive mode coupled to the at least one motor, the plurality of wheel being configured to support the vehicle body on ground;
   a ducted fan disposed in the aft end of the body and structured and arranged to provide horizontal propulsion during flight, wherein the ducted fan defines a fan axis substantially parallel to the longitudinal axis;
   at least two folding wings coupled to the body, wherein the folding wing are adapted to fold around wing folding axes substantially parallel to the longitudinal axis, and wherein the folding wings are adapted to transmit lift to the body during flight and provide less lift when folded, wherein the folding wings are disposed on first and second sides of the vehicle body and each of the folding wings is structured and arranged to fold along one of the sides of the body;
   a plurality of pods pivotably mounted to the folding wings; and
   a plurality of foldable propeller blades pivotably mounted to the pods and configured to fold against the pods when in a stowed position.

15. The combined flying-driving vehicle of claim 14, wherein each pod comprises at least one electric motor.

16. The combined flying-driving vehicle of claim 14 further comprising at least one of an electric motor and a hydrocarbon fuel engine adapted to power the ducted fan.

17. The combined flying-driving vehicle of claim 14 further comprising one or more of a steering wheel adapted to turn the vehicle, an accelerator pedal adapted to accelerate the vehicle, a brake pedal adapted to decelerate the vehicle.

18. The combined flying-driving vehicle of claim 14 further comprising at least one digital computer with at least one power source adapted to stabilize and control the vehicle, wherein the at least one digital computer is wirelessly networked to a data source comprising data about at least one of real-time traffic, weather, and airspace.

19. The combined flying-driving vehicle of claim 14 further comprising at least one digital computer with at least one power source adapted to stabilize and control the vehicle, wherein the digital computer is adapted to interpret high level commands from the operator to operate the vehicle substantially autonomously.

20. The combined flying-driving vehicle of claim 14 further comprising pod doors on sides of the vehicle body adapted to enclose the pods when the wings are folded.

\* \* \* \* \*